(12) United States Patent
Peters

(10) Patent No.: US 8,393,089 B2
(45) Date of Patent: Mar. 12, 2013

(54) MEASURING METHOD AND APPARATUS

(76) Inventor: Andy Peters, Brampton (CA)

( * ) Notice: Subject to any disclaimer, the term of this patent is extended or adjusted under 35 U.S.C. 154(b) by 0 days.

(21) Appl. No.: 13/189,605

(22) Filed: Jul. 25, 2011

(65) Prior Publication Data

US 2012/0090187 A1 Apr. 19, 2012

Related U.S. Application Data

(60) Provisional application No. 61/392,778, filed on Oct. 13, 2010.

(51) Int. Cl.
*G01B 3/10* (2006.01)
(52) U.S. Cl. .......................................................... 33/756
(58) Field of Classification Search ..................... 33/756, 33/758, 771
See application file for complete search history.

(56) References Cited

U.S. PATENT DOCUMENTS

| 2,602,233 | A | * | 7/1952 | Irving | 33/756 |
| 5,286,972 | A | * | 2/1994 | Falk et al. | 33/756 |
| 6,012,228 | A | * | 1/2000 | Fisanich | 33/759 |
| 2002/0088133 | A1 | * | 7/2002 | McMillan | 33/756 |
| 2002/0133965 | A1 | * | 9/2002 | Gilber | 33/756 |
| 2007/0033823 | A1 | * | 2/2007 | Steinich | 33/756 |
| 2007/0256314 | A1 | * | 11/2007 | Ruiz | 33/759 |
| 2008/0307666 | A1 | * | 12/2008 | Mattsson et al. | 33/759 |
| 2011/0078914 | A1 | * | 4/2011 | Swanson et al. | 33/756 |

* cited by examiner

*Primary Examiner* — G. Bradley Bennett
(74) *Attorney, Agent, or Firm* — Walter J. Tencza, Jr.

(57) ABSTRACT

A flexible and non-elastic cord is provided. The cord may have a first plurality of markings, spaced apart by a uniform first distance, and a second plurality of markings, spaced apart by a uniform second distance. The uniform first distance may be substantially larger than the uniform second distance. Each of the first plurality of markings may be colored a first color. Each of the second plurality of markings may be colored a second color which is different from the first color. Each of the first plurality of markings and each of the second plurality of markings may be a straight line. The uniform first distance may be sixteen inches and the uniform second distance may be twelve inches. The cord may be placed next to a winding path to be measured, so that the cord follows the winding path, and the winding path may be measured using the cord.

20 Claims, 2 Drawing Sheets

MEASURING METHOD AND APPARATUS

CROSS REFERENCE TO RELATED APPLICATION(S)

This application claims the priority of U.S. provisional patent application Ser. No. 61/392,778, filed on Oct. 13, 2010, titled "Measured String".

FIELD OF THE INVENTION

This invention relates to improved methods and apparatus concerning measuring.

BACKGROUND OF THE INVENTION

Prior to starting various construction projects, measurements of a project location must be taken. Some areas can be difficult to measure, as they may possess strange curves, shapes, or other obstacles. In some cases, the intended products of the projects have odd shapes that must be accounted for. Traditional measuring devices may not be flexible enough to accommodate different shapes, leading to miscalculated measurements. This, in turn, may cause users to purchase incorrect amounts of material, requiring frequent trips back and forth to hardware stores until the correct amount is acquired. An effective, convenient solution is needed.

SUMMARY OF THE INVENTION

In at least one embodiment of the present application an apparatus is provided comprising a cord. The cord may be flexible and non-elastic. The cord may have a first plurality of markings, spaced apart by a uniform first distance. The cord may have a second plurality of markings, spaced apart by a uniform second distance. The first distance may be substantially larger than the second distance. Each of the first plurality of markings may be colored a first color. Each of the second plurality of markings may be colored a second color which is different from the first color. The cord may be made of nylon. Each of the first plurality of markings may be colored red, and each of the second plurality of markings may be colored black. Each of the first plurality of markings and each of the second plurality of markings may be a straight line. The uniform first distance may be sixteen inches and the uniform second distance may be twelve inches.

At least one embodiment of the present application may also include a method comprising laying a cord next to a winding path to be measured, so that the cord follows the winding path, and measuring the winding path using the cord. The cord may be constructed as previously described.

DETAILED DESCRIPTION OF THE DRAWINGS

Figure 1:
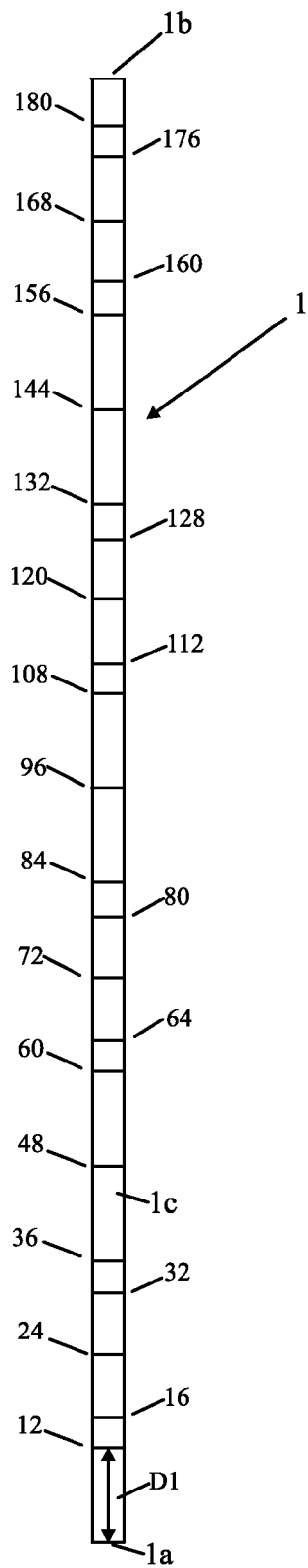
FIG. 1 shows a top view of a cord in accordance with an embodiment of the present invention, with the cord shown in a first state.

FIG. 1 shows a top view of a cord 1 in accordance with an embodiment of the present invention, with the cord 1 shown in a first state. In the first state, the cord 1 is straight. The cord 1 may be solid. The cord 1 may be a string made out of nylon. The cord 1 has an end 1a and an end 1b. The cord 1 includes a plurality lines which may indicate a certain number of inches, for example. The cord 1 includes lines 12, 16, 24, 32, 36, 48, 60, 64, 72, 80, 84, 96, 108, 112, 120, 128, 132, 144, 156, 160, 168, 176, and 180, each of which refers to a corresponding number of inches in distance from the end 1a. For example, line 12, is a perpendicular distance of D1 away from end 1a, wherein D1 may be equal to twelve inches. Similarly, line 16 is a perpendicular distance of sixteen inches away from end 1a, line 24 is a perpendicular distance of twenty-four inches away from end 1a, and line 32 is a perpendicular distance of thirty-two inches away from end 1a.

In accordance with an embodiment of the present invention, lines 12, 24, 36, 60, 72, 84, 108, 120, 132, 156, 168, and 180 which are a multiple of twelve inches from the end 1a may be colored black, while lines 16, 32, 64, 80, 112, 128, 160, and 176 which are a multiple of sixteen inches from the end 1a may be colored a different color such as red. Lines 48, 96, and 144 which are a multiple of both twelve and sixteen inches away from end 1a, may be partially colored black and partially colored red.

Figure 2:
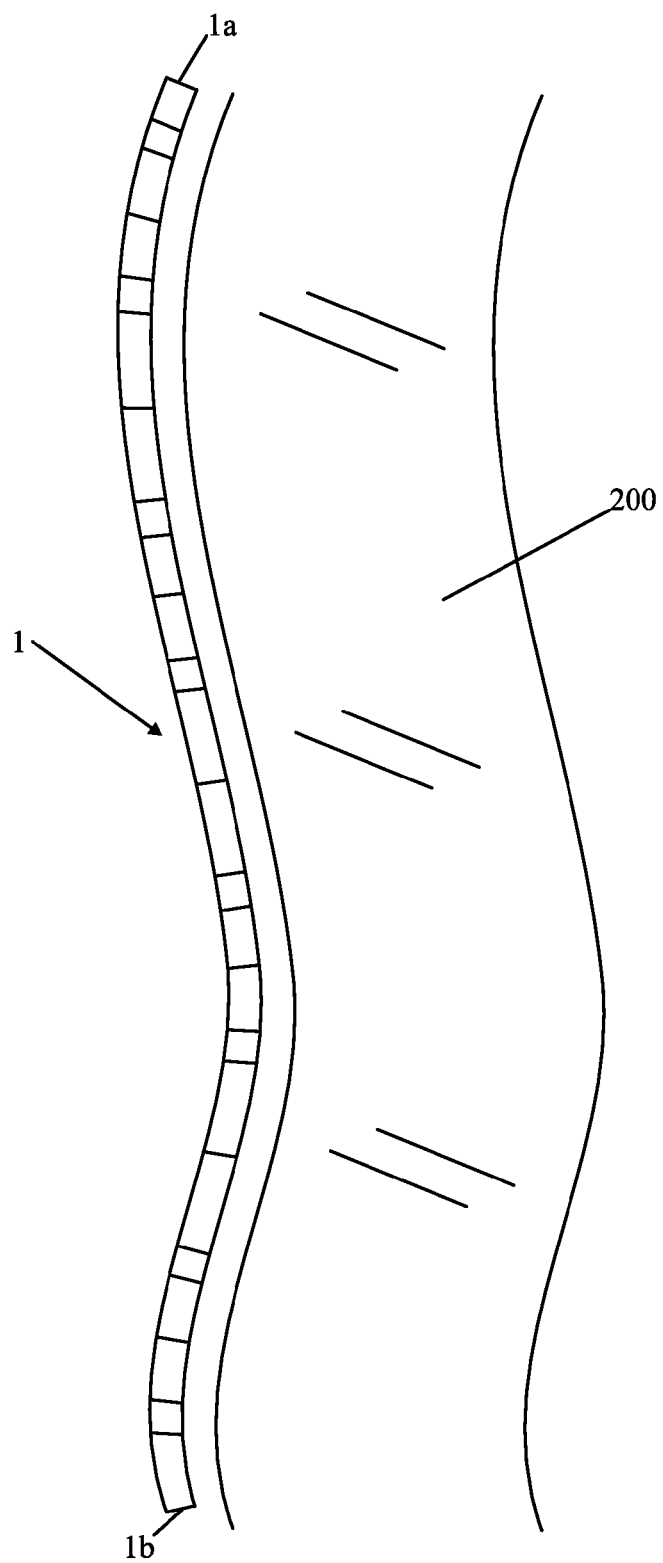
FIG. 2 shows a top view of the cord of FIG. 1, with the cord shown in a second state and next to a walking path.

FIG. 2 shows a top view of the cord of FIG. 1, with the cord 1 shown in a second state and next to a walking path 200. The walking path 200 is curved. The cord 1 is flexible and can be made to follow the walking path 200 so that the distance of the curved walking path 200 can be measured.

The apparatus 1 is designed to aid consumers in accurately measuring curved or oddly-shaped spaces for construction or landscaping projects. The apparatus 1 has a body portion 1c. The apparatus 1 and the body portion 1c may be made partially or entirely of nylon string or other durable, flexible material. The apparatus 1 and body portion 1c, in an least one embodiment, are entirely or partially made of a non-stretchable, non-elastic material, such as nylon string.

The apparatus 1 may be used, for example, by consumers when laying out the sizes and shapes of decks, retaining walls, pathways, and other similar projects. By helping users to determine accurate measurements of different spaces, the apparatus 1 also helps users to determine precise amounts of materials necessary to complete various projects. Professional contractors and homeowners alike will benefit from the use of apparatus 1.

The apparatus 1 aids consumers in accurately measuring curved or oddly-shaped spaces for construction projects. The provision of different markings for twelve inch intervals versus sixteen inch intervals is useful when completing certain projects, such as buildings decks. When laying out the size and shape of a deck, the sixteen inch markings can be used to determine the number of floor joists necessary in constructing the deck, while the twelve inch marking can be used for another purpose. For example, the twelve inch marking can be used to measure fence runs for a perimeter of a property to indicate a standard eight foot spacing of fence post locations or whatever the desired or required spacing may be. The apparatus 1, although shown as little more than one hundred eighty inches for descriptive purposes in FIG. 1, may come in lengths of two hundred and fifty feet, or in other embodiments, more or less than two hundred and fifty feet and can be kept and/or wound on a provided holding spool. Spikes and rings can also be included, in a kit to hold the apparatus 1 in place for more accurate measuring. The body portion 1c of the apparatus 1 may be colored in neon or in very bright colors, such as yellow, for optimal visibility. The exact specifications may vary.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a cord, wherein the cord is flexible and non-elastic;
wherein the cord is an elongated string having a length and a width, wherein the length is substantially greater than the width;
wherein the cord has a first plurality of markings, spaced apart by a uniform first distance;
wherein the cord has a second plurality of markings, spaced apart by a uniform second distance;
wherein a majority of the cord is colored a first color;
wherein the first distance is substantially larger than the second distance;
wherein each of the first plurality of markings is colored a second color;
wherein each of the second plurality of markings is colored a third color; and
wherein the first, the second, and the third colors are different from each other.

2. The apparatus of claim 1 wherein
the cord is made of nylon.

3. The apparatus of claim 2 wherein
each of the first plurality of markings is colored red, and each of the second plurality of markings is colored black.

4. The apparatus of claim 1 wherein
each of the first plurality of markings and each of the second plurality of markings is a straight line;
wherein each of the first plurality of markings is substantially perpendicular to the length of the cord; and
wherein each of the second plurality of markings is substantially perpendicular to the length of the cord.

5. The apparatus of claim 1 wherein
the uniform first distance is sixteen inches and the uniform second distance is twelve inches.

6. A method comprising the steps of:
laying a cord next to a winding path to be measured, so that the cord follows the winding path;
wherein the cord is an elongated string having a length and a width, wherein the length is substantially greater than the width;
wherein a majority of the cord is colored a first color;
measuring the winding path using the cord;
wherein the cord has a first plurality of markings, spaced apart by a uniform first distance;
wherein the cord has a second plurality of markings, spaced apart by a uniform second distance;
wherein the first distance is substantially larger than the second distance;
wherein each of the first plurality of markings is colored a second color;
wherein each of the second plurality of markings is colored a third color; and
wherein the first, the second, and the third colors are different from each other.

7. The method of claim 6 wherein
the cord is made of nylon.

8. The method of claim 7 wherein
each of the first plurality of markings is colored red, and each of the second plurality of markings is colored black.

9. The method of claim 6 wherein
each of the first plurality of markings and each of the second plurality of markings is a straight line;
wherein each of the first plurality of markings is substantially perpendicular to the length of the cord; and
wherein each of the second plurality of markings is substantially perpendicular to the length of the cord.

10. The method of claim 6 wherein
the uniform first distance is sixteen inches and the uniform second distance is twelve inches.

11. The apparatus of claim 1 wherein
the cord is numberless.

12. The apparatus of claim 1 further comprising
a plurality of devices for holding the cord in place.

13. The apparatus of claim 12
wherein each of the plurality of devices includes a spike.

14. The apparatus of claim 1 wherein
the first color is yellow.

15. The apparatus of claim 1 wherein
the cord includes a plurality of locations along the length of the cord, wherein at each of the plurality of locations one of the first plurality of markings and one of the second plurality of markings are located, such that each of the plurality of locations is both partially colored the second color and partially colored the third color.

16. The method of claim 6 wherein
the cord is numberless.

17. The method of claim 6 further comprising
using a plurality of devices to hold the cord in place next to the winding path.

18. The method of claim 17 wherein
each of the plurality of devices includes a spike.

19. The method of claim 6 wherein
the first color is yellow.

20. The method of claim 6 wherein
the cord includes a plurality of locations along the length of the cord, wherein at each of the plurality of locations one of the first plurality of markings and one of the second plurality of markings are located, such that each of the plurality of locations is both partially colored the second color and partially colored the third color.

* * * * *